United States Patent [19]

Wakatsuki et al.

[11] Patent Number: 5,055,786
[45] Date of Patent: Oct. 8, 1991

[54] BARBER-POLE MAGNETORESISTIVE MAGNETIC FIELD SENSOR

[75] Inventors: Noboru Wakatsuki; Shigemi Kurashima, both of Kawasaki; Nobuyoshi Shimizu; Michiko Endoh, both of Yokohama; Akira Tanaka, Kawasaki, all of Japan

[73] Assignee: Fujitsu Limited, Kawasaki, Japan

[21] Appl. No.: 494,669

[22] Filed: Mar. 16, 1990

Related U.S. Application Data

[62] Division of Ser. No. 233,428, Aug. 18, 1988, Pat. No. 4,967,598.

[30] Foreign Application Priority Data

Aug. 18, 1987 [JP] Japan ................ 62-204381
May 7, 1988 [JP] Japan ................ 63-110882

[51] Int. Cl.$^5$ .......................... G01R 33/06
[52] U.S. Cl. .................. 324/252; 324/207.21; 73/DIG. 3

[58] Field of Search ............ 73/517 R, DIG. 3; 324/207.21, 252; 360/113; 338/324, 32 R

[56] References Cited

FOREIGN PATENT DOCUMENTS

3514457 1/1987 Japan ................ 324/252
0000413 1/1989 Japan ................ 324/207.21

Primary Examiner—Hezron E. Williams
Assistant Examiner—Craig Miller
Attorney, Agent, or Firm—Staas & Halsey

[57] ABSTRACT

A magnetic field sensor for an acceleration sensor including a cantilever beam having a free end to which a permanent magnet is attached. A pair of the magnetic sensors, each consisting of a barber-pole type magnetoresistive sensing element, are arranged opposite to and symmetrically. The cantilever is bent and the magnet is moved according to an acceleration, which is detected as outputs from the magnetoresistive sensing elements.

4 Claims, 12 Drawing Sheets

BARBER-POLE MAGNETORESISTIVE MAGNETIC FIELD SENSOR

CROSS-REFERENCE TO RELATED APPLICATION

This application is related as a divisional application to application Ser. No. 07/233,428 filed Aug. 18, 1988 now U.S. Pat. No. 4,967,598 in the name of the same inventors and claiming common priority benefit under 35 USC § 119.

BACKGROUND OF THE INVENTION

1. Field of the Invention

This invention relates to a magnetic field sensor and, more particularly, to a magnetoresistive magnetic field sensor for detecting a magnetic field.

2. Description of the Related Art

Magnetic or electric field sensors are commonly used in acceleration sensor systems. For example, an acceleration sensor having a beam which is bendable or deformable according to an acceleration exerted thereon comprises a cantilever beam having one end fixed to a base, a weight rigidly secured to the other end of the beam, an electrode attached to the base at the same level as the weight, and another electrode fixed on the base. The weight is moved and the beam is bent in accordance with an acceleration exerted on the weight. Therefore, the distance, i.e., the static electrical capacity between the two electrodes, is changed and, therefore, a value of acceleration according to the change can be detected. Alternatively, a direct current electrical resistance between the two electrodes can be measured to determine a value of acceleration.

This type of known acceleration sensor, however, can only be used when the direction of acceleration is constant and when the capacity change is relatively large, since it is relatively difficult to detect the change in the static electrical capacity between the two electrodes.

Another known acceleration sensor also includes a cantilever beam bendable in accordance with an acceleration and a strain gauge mounted on the beam, so that a strain of the cantilever, i.e., a change in the electrical resistance of the strain gauge, corresponding to a value of acceleration exerted on a weight attached to a free end of the cantilever is detected. The cantilever may be made of a silicon substrate.

Assuming that an acceleration is now exerted in a direction in which the beam is bent and the weight having a mass (m) is subjected to a force, F=ma. In this case, a value of the electrical resistance will be represented as follows, on the basis of a stress T.

$$|\Delta \rho| = |\rho| |\pi| |T|$$

Where,

Δρ: change of specific resistance due to stress
ρ: specific resistance without strain
π: piezo resistance coefficient A semiconductor acceleration sensor is used to detect a value of acceleration on the basis of the change in this resistance.

In this type of known acceleration sensor, however, the cantilever beam possibly may be bent in other directions or torsioned according to the direction of an acceleration. In this case, an accurate detection of a value of acceleration in a particular direction, cannot be obtained. These drawbacks are due, in part, to deficiencies in the magnetic or electric field sensor used to determine the value of acceleration.

SUMMARY OF THE INVENTION

An object of the present invention is to provide a magnetic field sensor for use in an acceleration sensor having a simple construction, and capable of stably detecting a value of an acceleration.

Another object of the present invention is to provide a magnetic field sensor capable of overcoming the disadvantages mentioned above with reference to the prior art.

Another object of the present invention is to provide a reliable magnetic field sensor.

According the present invention, there is provided a barber-pole type magnetoresistive sensing element, comprising first and second zig-zig patterns of magnetic thin film lying substantially in a common plane, each film pattern comprising a first plurality of spaced, parallel segments extending in a first direction and a second plurality of spaced, parallel segments extending in a second direction transverse to the first direction and respectively, integrally interconnecting the adjacent first segments at the opposite ends thereof in an alternating sequence in accordance with the zig-zag pattern, the respective first segments of the first and second zig-zag patterns being interdigitized and parallel, spaced relationship and with the respective, second segments thereof being in spaced and parallel, aligned relationship, the first and second zig-zag patterns of magnetic thin films having respective, first ends defined corresponding input terminal pads and respective, second ends connected together to form a common output terminal pad; and first and second patterns parallel, spaced line segments conductive material having a higher conductivity than that of the magnetic thin film, formed on the respective first and second zig-zag patterns of magnetic thin film, the first conductive pattern line segments being angularly inclined, relatively to the first plurality of parallel segments of the first zig-zag pattern, in a first sense, and the second conductive line segments being angularly inclined, relatively to the first plurality of parallel segments of the second, zig-zag pattern in a second, opposite sense, the first and second conductive material line segment patterns producing respective, first and second net bias current flow paths in the corresponding first and second magnetic thin film patterns which are angularly inclined with respect to each other.

In another aspect of the present invention, there is provided a magnetic field sensor for sensing magnetic fields, comprising a base having a flat surface, first and second magnetic sensors respectively comprising first and second zig-zag patterns of magnetic thin film lying substantially in a common plane on said flat surface, each film pattern comprising a first plurality of spaced, parallel segments extending in a first direction and a second plurality of spaced, parallel segments extending in a second direction transverse to the first direction and respectively, integrally interconnecting the adjacent first segments at the opposite ends thereof in an alternating sequence in accordance with the zig-zag pattern, the respective first segments of the first and second zig-zag patterns being in interdigitized and parallel, spaced relationship and with the respective, second segments thereof being in spaced and parallel, aligned relationship, the first and second zig-zag patterns of magnetic thin films having respective, first ends defining corresponding input terminal pads and respective, second ends connected together to form a common output terminal pad, first and second patterns of parallel, spaced line segments conductive material having a higher conductivity than that of the magnetic thin film, formed on the respective first and second zig-zag patterns of magnetic thin film, the first conductive pattern line segments being angularly inclined, relatively to the first plurality of parallel segments of the first zig-zag pattern, in a first sense, and the second conductive line segments being angularly inclined, relatively to the first plurality of parallel segments of the second, zig-zag pattern in a second, opposite sense, the first and second conductive material line segment patterns producing respective, first and second net bias current flow paths in the corresponding first and second magnetic thin film patterns which are angular inclined with respect to each other, the first and second magnetic sensors being fixedly mounted on the flat surface of the base at predetermined positions substantially symmetrically spaced from each other, one of the input terminals of the first magnetic sensor being electrically connected to one of the input terminals of the second magnetic sensor, the other of the input terminals of the first magnetic sensor being electrically connected to the other of the input terminals of the second magnetic sensor, an electric source for applying an electrical voltage between said one and the other input terminals, and a comparator for comparing outputs of said common output terminal pad of the first magnetic sensor and said common output terminal pad of the second magnetic sensor.

DESCRIPTION OF THE PREFERRED EMBODIMENTS

Figure 1:
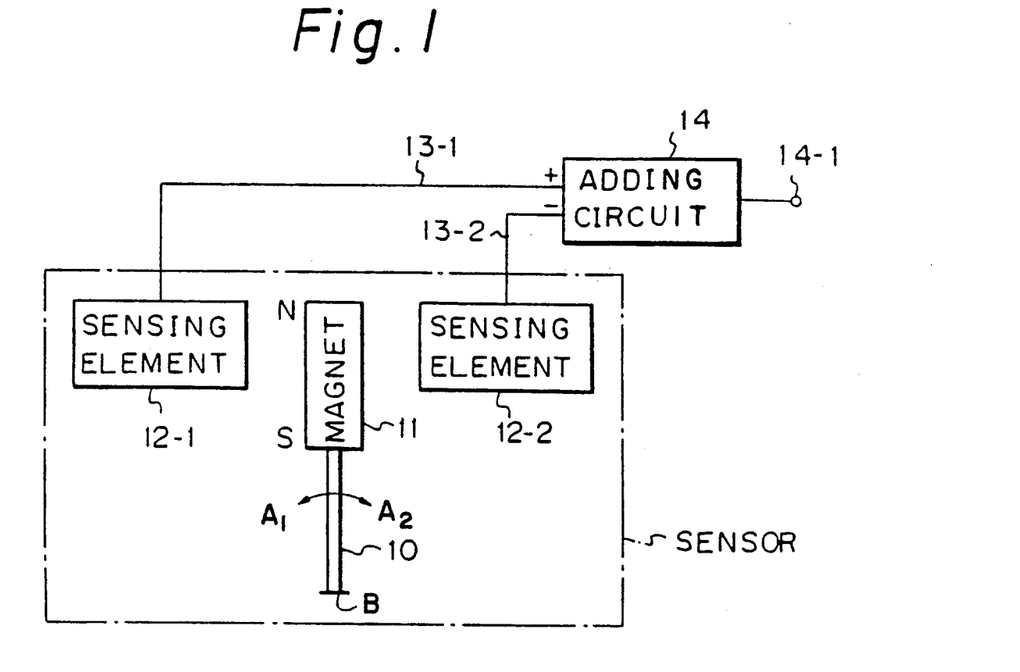
FIG. 1 is a schematical block diagram illustrating a magnetic field sensor according to the present invention as applied to an acceleration sensor.

Referring now to FIG. 1, an acceleration sensor essentially includes a beam 10 which is bent according to an acceleration exerted thereon, a permanent magnet 11 having N and S poles as shown, a pair of barber-pole type magnetoresistive sensing elements 12-1 and 12-2 in accordance with the present invention, output signal lines 13-1 and 13-2 of the elements 12-1 and 12-2, respectively, an adding circuit 14, and an output signal terminal 14-1.

For example, a cantilever beam 10 bendable by an acceleration has one end rigidly secured to a base B and the other end to which a permanent magnet 11 is attached. A pair of barber-pole type magnetoresistive sensing elements 12-1 and 12-2 are arranged at the respective sides of the permanent magnet 11 and symmetrically with respect to the beam 10. The output signals of these barber-pole elements 12-1 and 12-2 are input through the output signal lines 13-1 and 13-2 to an adding circuit 14 in which the outputs are added in reverse polarity, so that an acceleration is determined in accordance with the output from the adding circuit 14.

In FIG. 1, assuming that m is a mass of the permanent magnet 11 attached to the bendable beam 10, G is an acceleration exerted on the permanent magnet 11, and x is a distance through which the permanent magnet 11 is moved, for example, toward the barber-pole element 12-2, then if k is a constant of proportion, the following representation is given:

$$G = kx/m$$

Consequently, assume that the beam 10 is bent as shown by arrow $A_2$ due to an acceleration exerted thereon and approaches the barber-pole element 12-2 from an initial position, in which the permanent magnet 11 is positioned when an acceleration is not exerted thereon. The displacement of the permanent magnet 11 can be read out from the change in electric signals representing the voltage change in the output line 13-2 of the magnetoresistive element 12-2, and thus a value of acceleration can be directly read out on the basis of this displacement. If an acceleration is exerted in the opposite direction, i.e., of arrow $A_1$, and the permanent magnet 11 approaches the magnetoresistive element 12-1, a value of acceleration can be determined in the same manner as above.

An operation to determine a value of acceleration can be also carried out in a same manner as above, even if a magnetoresistive element 12 is attached on one end of a beam 10 and a pair of magnets 11 are stationarily arranged at the respective, opposite sides of the element 12 and symmetrically with respect to the beam 10, or even if a magnetoresistive element 12 is attached on a middle portion of a bendable beam connected at the respective, opposite ends thereof to suitable base supports.

When the magnet 11 is moved by a certain distance due to an acceleration exerted thereon, from an initial position in which the above-mentioned pair of element 12-1 and 12-2 are located symmetrically to each other relative to the magnet 11, the magnetoresistive elements 12-1 and 12-2 detect the distance independently. The outputs of the elements 12-1 and 12-2 are transmitted via the signal lines 13-1 and 13-2, respectively, to the adding circuit 14, in which the values are added in opposite polarity to each other. Thus, an output obtained is at the adding circuit 14 which is twice the output of each of the respective elements 12-1 and 12-2.

Generally speaking, the magnetoresistive elements 12-1 and 12-2 are readily affected by a disturbance of a magnetic field, such as a geomagnetism. But, according to the present invention, such a disturbance is counter-balanced and the output signals are enhanced by a factor of two (2) in the adding circuit 14, so that a highly sensitive and practical acceleration sensor can be obtained by using barber-pole magnetoresistive sensing elements, which provide a linear output with respect to a magnetic field and can be arranged at preferred positions, since they do not need a bias magnetic field, as will be mentioned later.

Figure 2:
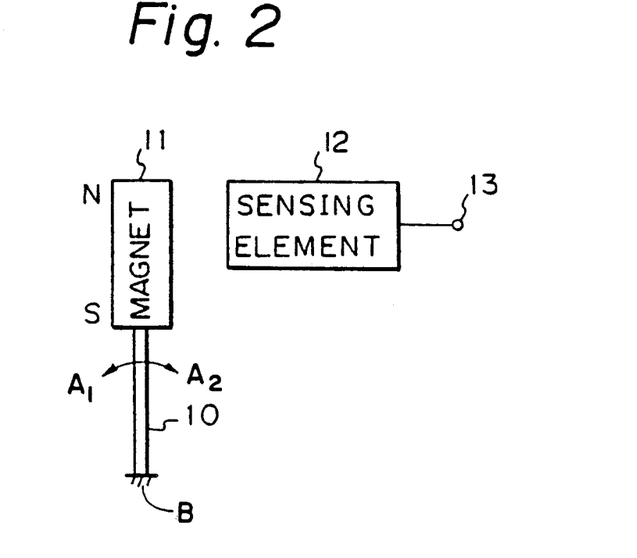
FIG. 2 is also a schematical block diagram of another magnetic field sensor of this invention as applied to an acceleration sensor.
Figures 3, 4A, 4B, 4C:
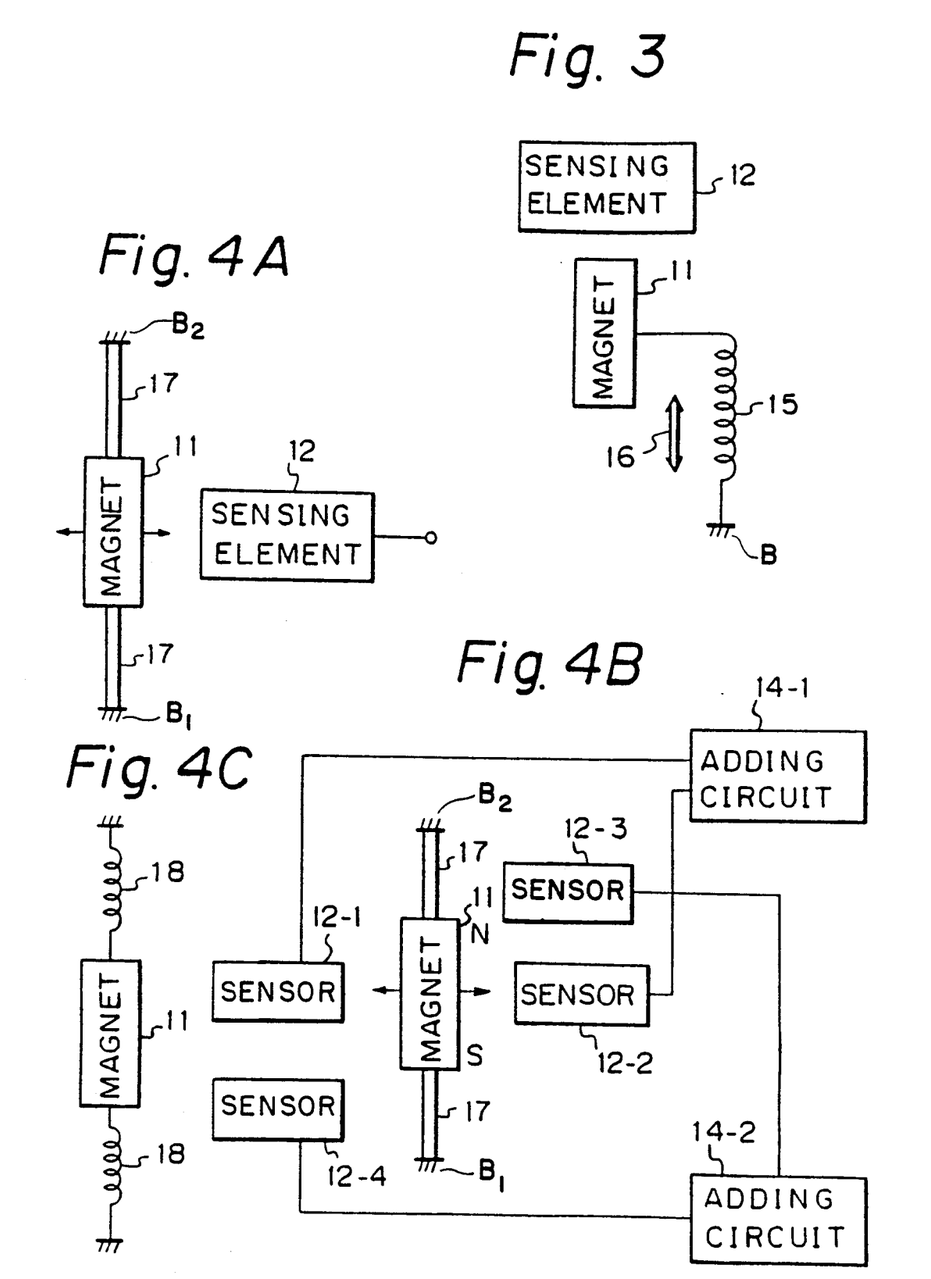
FIG. 3 is a schematic view of a variation of the acceleration sensor utilizing a magnetic field sensor of the present invention shown in FIG. 2.
FIGS. 4A, 4B and 4C are schematic views of other variations of the acceleration sensor utilizing a magnetic field sensor of the present invention.

In FIG. 3, a coil spring 15 is used instead of the beam 10 and the magnet 11 is attached to a top end of the coil spring 15. The distance between the magnet 11 and a magnetoresistive sensing element 12 is changed by the coil spring 15 in the direction shown by an arrow 16, so that an acceleration can be detected in the same manner as in the previous embodiments shown in FIGS. 1 and 2.

FIG. 4A shows an embodiment including another beam 17 supported by the opposite ends thereof. In FIG. 4A, the ends of the beam 17 are fixedly connected to the base B₁ and B₂ and a magnet 11 is mounted on a middle portion of the beam 17 so as to face a single magnetoresistive sensing element 12. When the magnet 11 is moved and a gap between the magnet 11 and the element 12 is increased or reduced, an acceleration can be detected in the same manner as the above.

In FIG. 4B, respective, opposite ends of a beam 17 are fixedly connected to the bases B₁ and B₂ and two pairs of magnetoresistive sensing elements 12-1, 12-2, 12-3, and 13-4 are arranged at respective sides of the magnet 11 on respective lines perpendicular to each other. In general, if an acceleration is exerted in a direction parallel to a plane in which the element 12-1, magnet 11, and element 12-2 exist, a value of acceleration can be obtained as changes in gaps between the magnet 11 and the elements 12-1 and 12-2. But, if an acceleration is exerted in a different direction, an accurate value of acceleration cannot be obtained from the output of the adding circuit 14-1 in which the outputs of only the elements 12-1 and 12-2 are added. To avoid this problem, this embodiment provides another pair of magnetoresistive sensing elements 12-3 and 12-4 so that another output is obtained in the adding circuit 14-2, in which the outputs of sensors 12-3 and 12-4 are added as vectors. A beam 17 may be a cantilever or a beam supported by the respective ends thereof and may have a circular or rectangular cross-section.

In FIG. 4C, a coil spring 18 is fixedly connected to the base by respective ends thereof and a magnet 11 is mounted on a middle portion of the coil spring 18.

Figure 5:
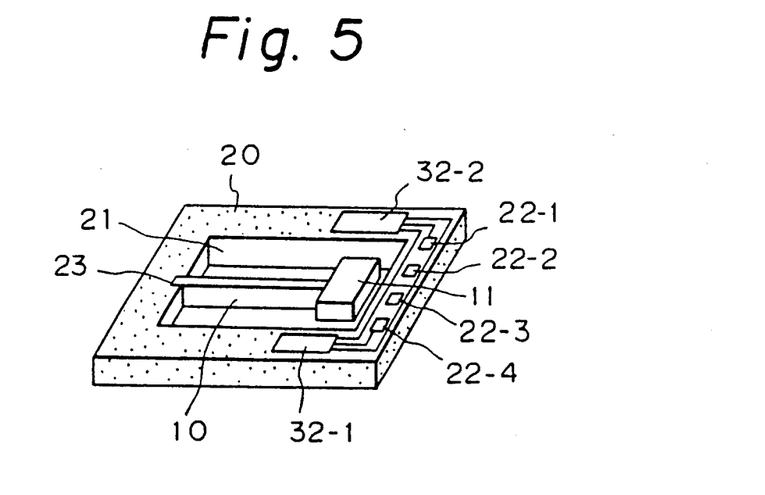
FIG. 5 is a perspective view illustrating in detail an embodiment of the acceleration sensor utilizing a magnetic field sensor to the present invention.

FIG. 5 shows in detail an embodiment of an acceleration sensor indicated by a dotted line in FIG. 1, in which a silicon substrate is used. This acceleration sensor comprises a silicon wafer 20 having an opening 21 provided therein, a beam 10, a permanent magnet 11, a pair of magnetoresistive sensing elements 32-1 and 32-2 used as transducers, and conductive pads 22-1 to 22-4 integrally formed with these elements 32-1 and 32-2 on the silicon wafer 20 for connecting these elements to an adding circuit (not shown). The beam 10 may be made of phosphorus bronze, and the permanent magnet 11 may be made of samarium cobalt having Br: 7000 gauss and Hc: 7000 oerstead. The silicon substrate 20, at one side of the opening 21, has a recess 23 into which the beam 10 is fixedly inserted. The beam 10 has a larger thickness in the transverse direction than in the vertical direction in the drawing. The opening 21 and recess 23 can be accurately formed by, for example, an etching process.

Figure 6:
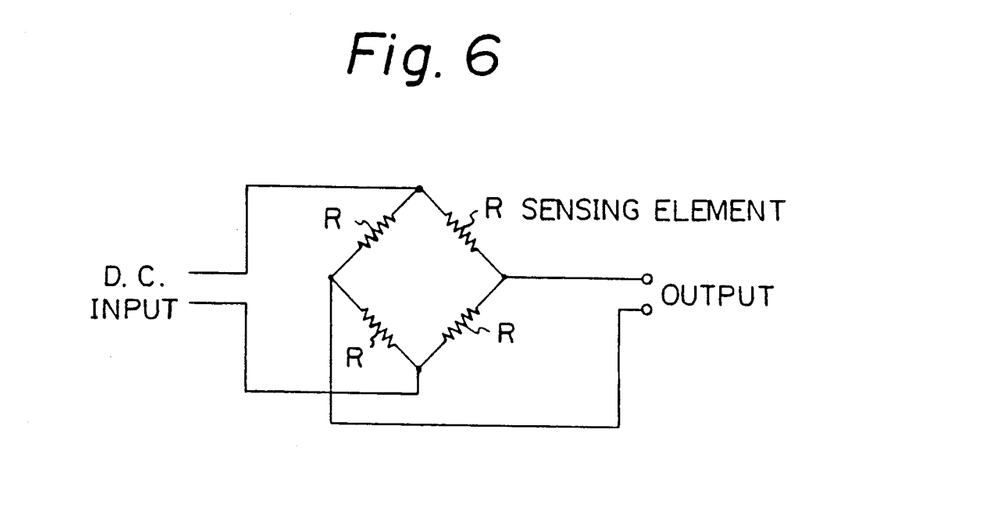
FIG. 6 is a block diagram of a circuit comprising magnetoresistive sensing elements.

The beam 10 can be bent in either direction toward the element 32-1 or 32-2 due to an acceleration exerted thereon in the horizontal direction. Each of the elements 32-1 and 32-2 may be constructed as a bridge consisting of four resistors R and formed on the silicon substrate 20, as shown in FIG. 6. Also, each of the elements 32-1 and 32-2 may be constructed in the shape of a barber-pole. In this case, a bias magnetic field is no longer necessary and a preferred output, i.e., a linear output with respect to the external magnetic field, can be obtained. Thus, an acceleration sensor having a stable performance with respect to a change of temperature may be obtained.

When the magnet 11 is moved toward or away from the magnetoresistive sensing elements 32-1 and 32-2, the output signals of these elements are changed and added in the adding circuit 14 (FIG. 1), in which a value of acceleration can be determined as mentioned above.

Both the beam 10 and magnet 11 shown in FIG. 5 may be made integrally as a single piece from, for example, a semirigid magnetic material.

Figure 7A:
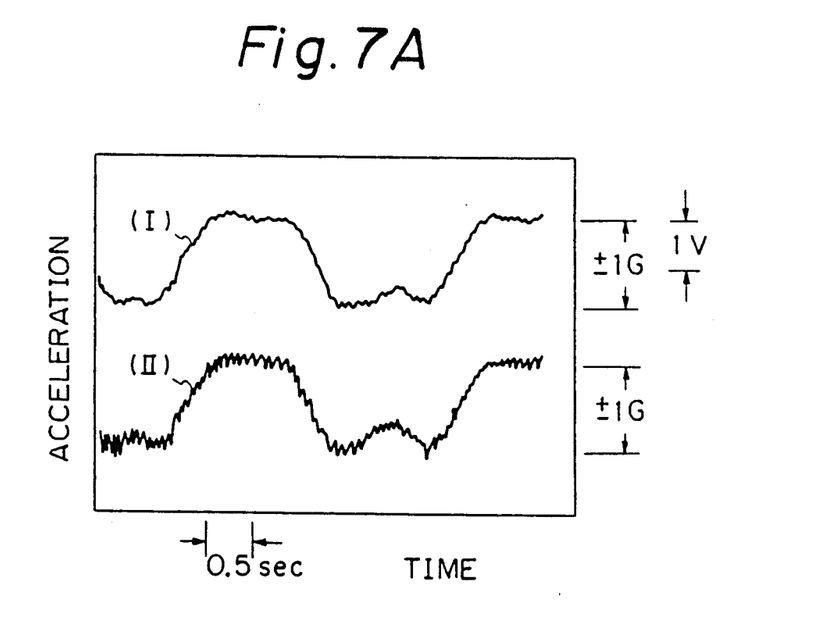
FIGS. 7a and 7B are diagrams showing the characteristics of the acceleration sensors utilizing a magnetic field sensor in accordance with the present invention.
Figure 7B:
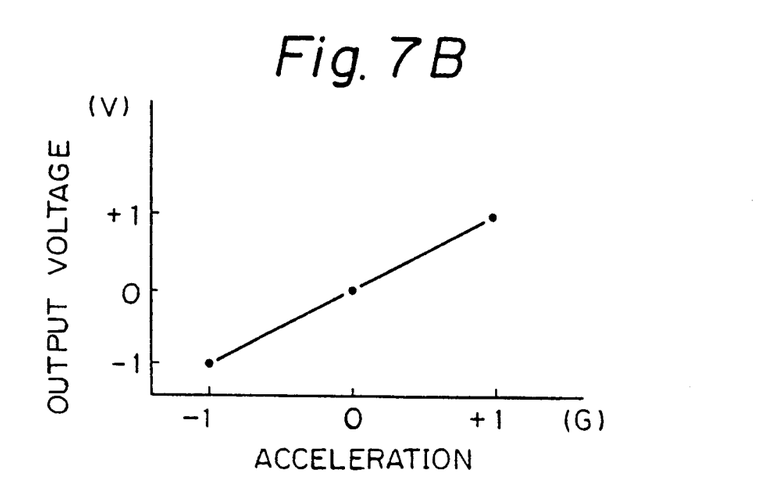

FIGS. 7A and 7B are diagrams showing outputs of the acceleration sensors. A wave curve (I) in FIG. 7A shows an output of a known acceleration sensor which is commercially available. A wave curve (II) in FIG. 7A shows an output of an acceleration sensor according to the embodiment of this invention as shown in FIG. 5. In both (I) and (II), the output voltage changes by about 1 volt with respect to a value of acceleration of $+1G$ or $-1G$. It has been confirmed that the relationship between the value of acceleration G and the output voltage V has a substantially linear characteristic, as shown in FIG. 7B.

Figure 8:
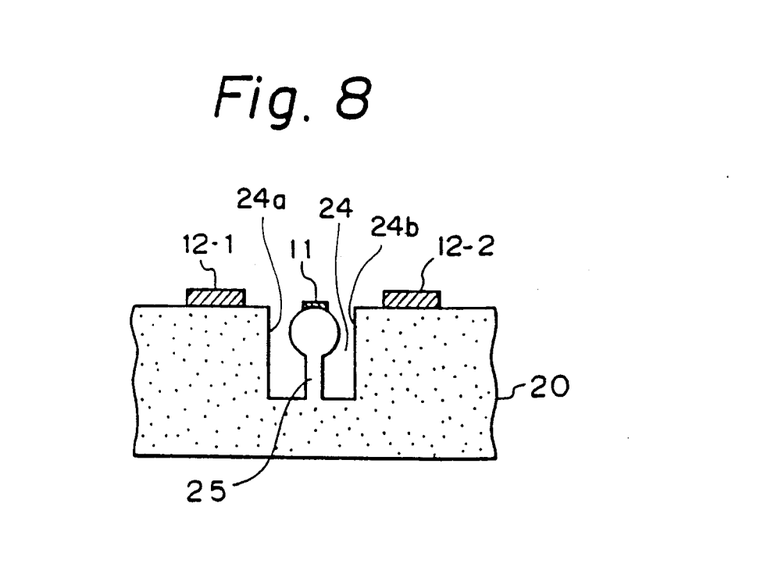
FIGS. 8 and 9 are partial cross-sectional views of the other embodiments utilizing a magnetic field sensor of the present invention.

FIG. 8 is a cross-sectional view taken along a vertical plane intersecting the magnetoresistive sensing elements 12-1 and 12-2 oriented as in FIG. 1, but in accordance with another embodiment thereof. In FIG. 8, a silicon substrate 20 is provided with a recess 24 and a vertical beam 25 is formed integrally with this silicon substrate 20. Magnetoresistive sensing elements 12-1 and 12-2 and a magnet 11 are arranged to be in a common horizontal plane. Inner walls 24a and 24b of the recess 24 serve as stoppers, when or if the beam 25 is suddenly bent by abrupt shocks.

Figure 9:
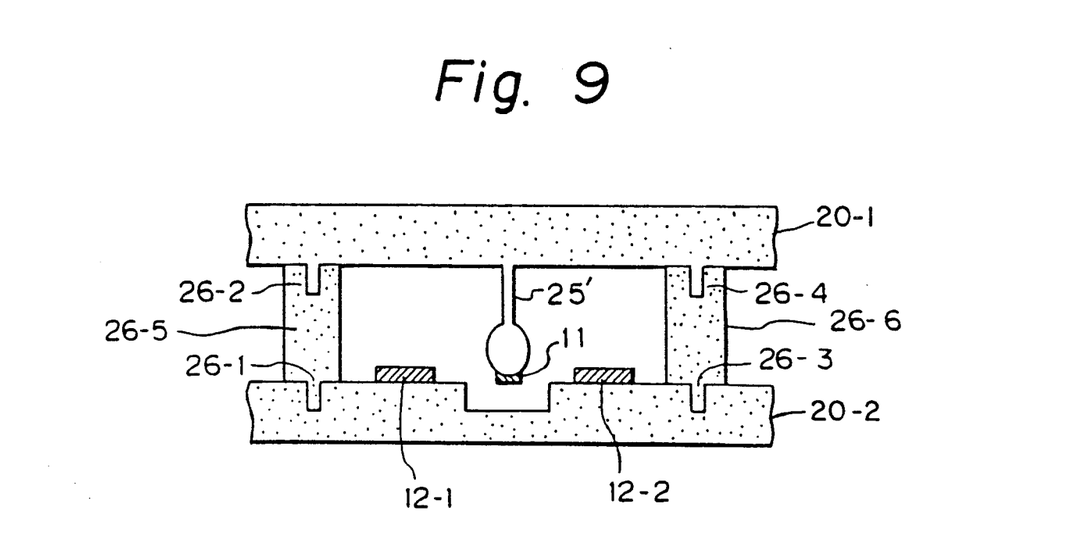

FIG. 9 is a cross-sectional view showing still another embodiment of an acceleration sensor utilizing a magnetic field sensor of the present invention. In FIG. 9, a vertical beam 25' extends in an opposite direction relative to the embodiment of FIG. 8. The beam 25' may be made of silicon or any other material. In this case, in order to accurately position the magnetoresistive sensing elements 12-1 and 12-2 with respect to the magnet 11, the upper and lower silicon substrates 20-1 and 20-2 and spacers 26-5 and 26-6 are provided with projections and holes as shown at 26-1, 26-2, . . . , and these projections are fitted into the holes to obtain a highly accurate acceleration sensor. The embodiment of FIG. 9 is advantageously applied to constitute an acceleration sensor as shown in FIG. 4B having two pairs of magnetoresistive sensing elements 12-1, 12-2, 12-3, and 12-4.

Figure 10:
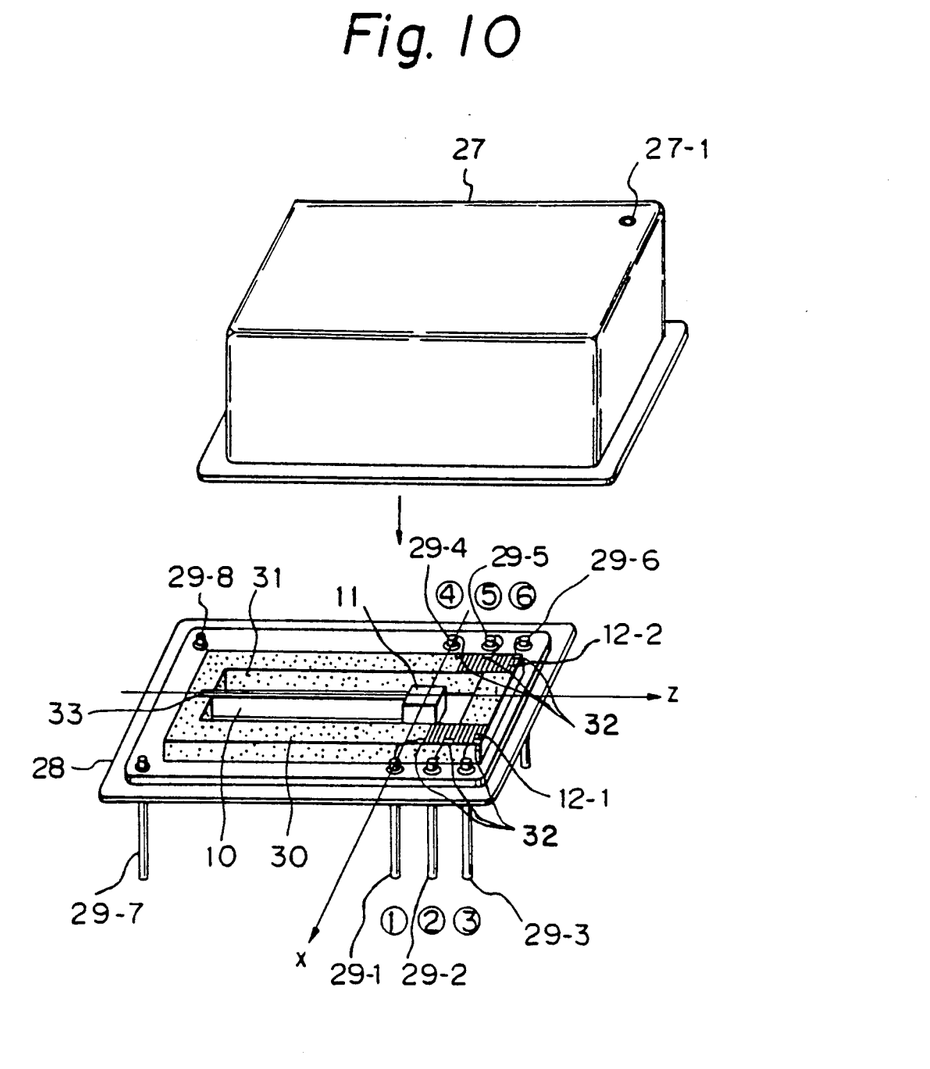
FIG. 10 is an exploded perspective view illustrating one embodiment of an acceleration sensor utilizing the magnetic field sensor of this invention.

FIG. 10 is an exploded perspective view illustrating an embodiment of an acceleration sensor utilizing a magnetic field sensor according to the present invention. A cap 27 and a base 28 cooperatively constituting a hermetic shield case are made of a magnetic material such as silicon steel, and the surfaces thereof are plated with nickel. The cap 27 has a sealing inlet 27-1 and the base 28 has external terminals 29-1 to 29-6 and other terminals 29-7 and 29-8, insulated from and fixed to this base 28.

After all elements and members for constituting the acceleration sensor are mounted on the base 28, the cap 27 is put on the base 28 and then the periphery of the cap 27 and base 28 are hermetically sealed together by, for example, welding, to form a magnetic shield case. Then, oil is filled into the case through the inlet 27-1 to prevent undesirable vibration and the inlet 27-1 is sealingly closed. An acceleration sensor according to the present invention is thus obtained, and such a sensor can be mounted on a printed circuit board.

The acceleration sensor shown in FIG. 10 has substantially the same construction as an embodiment shown in FIG. 5. Thus, a silicon substrate 30 has an opening 31 formed by an anisotropic etching and a cantilever beam 10 fixedly inserted into a recess 33. A permanent magnet 11 is attached to the beam 10 at one end thereof. A pair of barber-pole type magnetoresistive sensing elements 12-1 and 12-2 are arranged on the frame surfaces of the silicon substrate 30 which is fixed on the base 28 by an appropriate adhesive.

Figure 11:
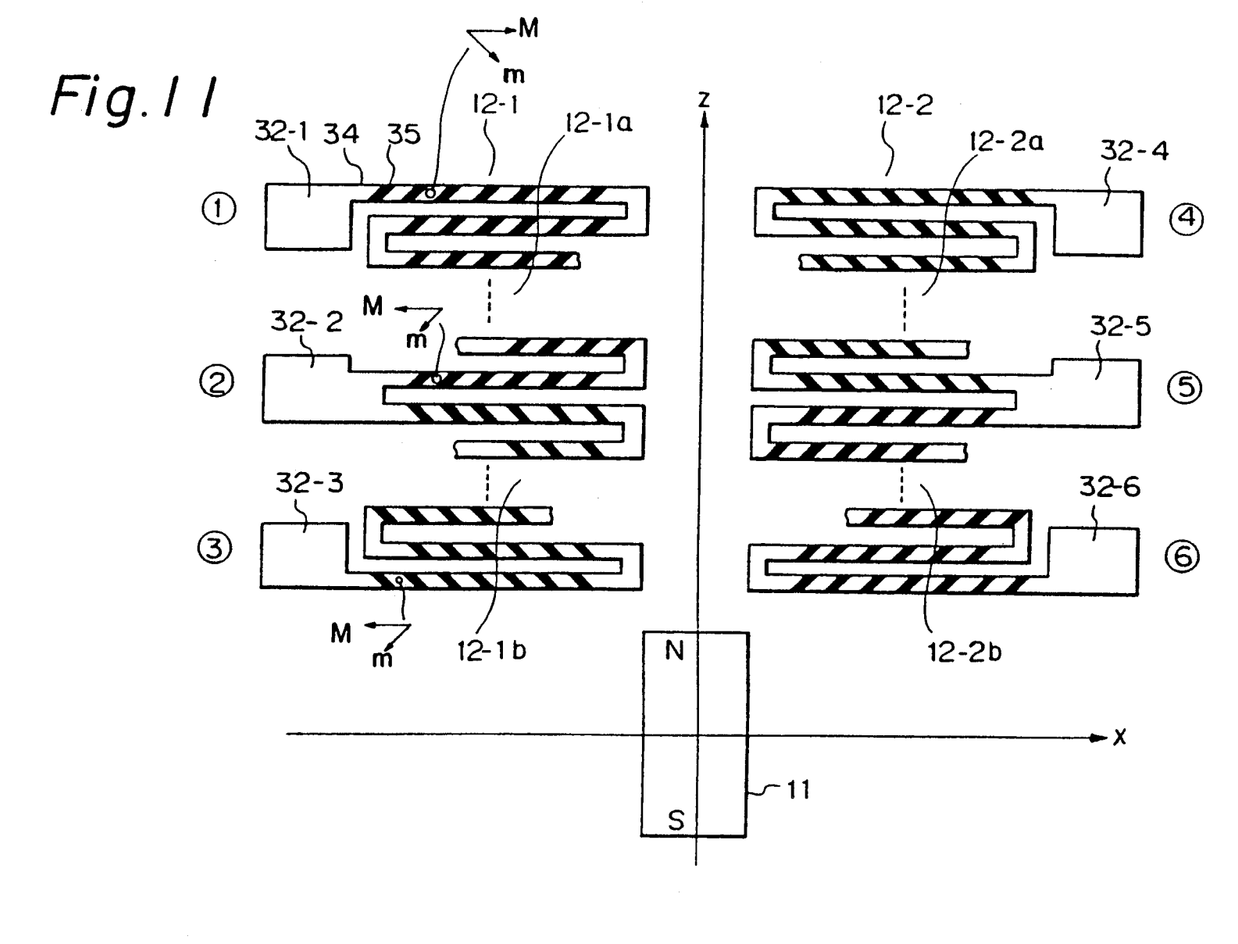
FIG. 11 is an enlarged plan view illustrating magnetoresistive sensing elements of the present invention.

As shown in FIG. 11, the magnetoresistive sensing elements 12-1 and 12-2 have respective, plural connecting pads 32, separately numbered ① to ⑥, which are connected to the external terminals 29-1 to 29-6, respectively, via aluminum wires (as shown in FIG. 10) by a wire bonding process.

Each of the barber-pole type elements 12-1 and 12-2 is formed in practice as a pattern shown in FIG. 11, including a winding or zig-zag pattern of a magnetic thin film 34 made of, for example, permalloy (Ni—Fe alloy), and a plurality of conductive patterns 35 attached thereon and angularly inclined relatively thereto by, for example 45°. The connecting pads 32-1 to 32-6 are formed as integral parts of these magnetic thin film patterns 34 and comprise longitudinally elongated portions parallel to the x-axis and perpendicular to the z-axis.

Each of the elements 12-1 and 12-2 includes resistive portions 12-1a and 12-1b, and 12-2a and 12-2b connected to each other in series and, thus, the barber-pole type patterns are connected to each other to form a bridge in such a manner that the voltage changes of the magnetoresistive sensing elements 12-1 and 12-2 according to the external magnetic field are output in opposite polarity to each other and the voltage changes of the resistive portions 12-1a and 12-1b (and 12-2a and 12-2b) are output in opposite polarity to each other.

Figure 12:
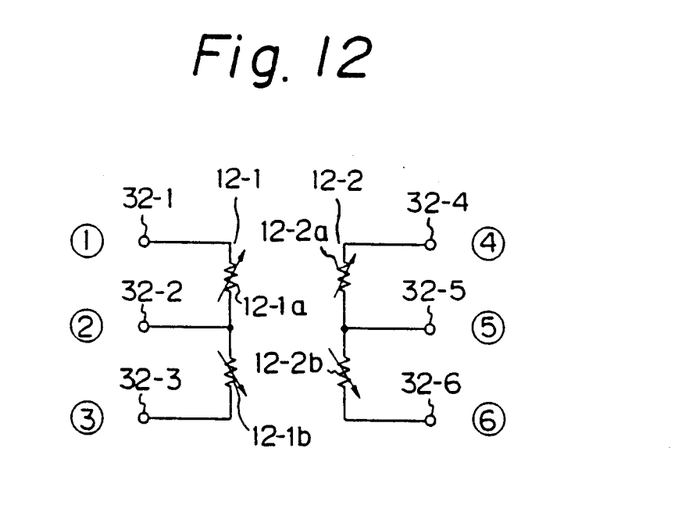
FIG. 12 is a view illustrating an equivalent circuit of the magnetoresistive sensing elements shown in FIG. 10.
Figure 13:
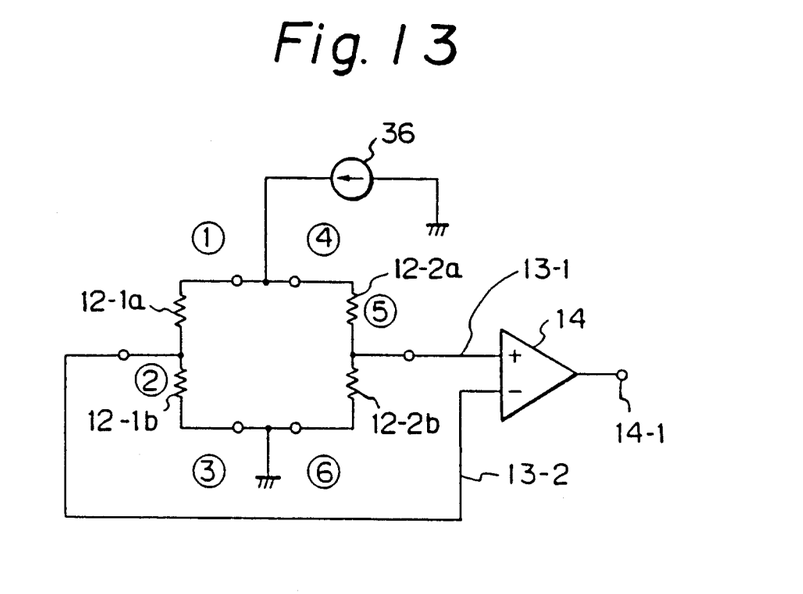
FIG. 13 is a diagram of a circuit constituting the acceleration sensor shown in FIG. 10.

FIG. 12 shows an equivalent circuit of the magnetoresistive sensing elements 12-1 (12-1a and 12-1b) and 12-2 (12-2a and 12-2b), in which the connecting pads 32-1 to 32-6 are used as terminals. Using the external terminals 29-1 to 29-6, these sensing elements are connected at the outside of the hermetic shield case to form a bridge as shown in FIG. 13, in which a D.C. power 36 is connected to the bridge to supply a constant current to the respective sensing elements, so that the output signals thereof are input to the adding circuit 14 having an output terminal 14-1 as shown in FIG. 1.

Figure 14:
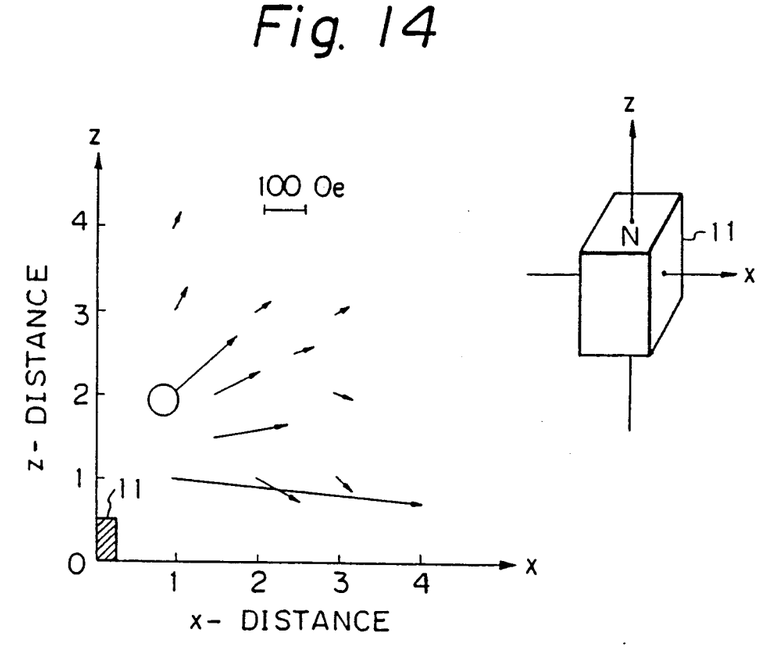
FIG. 14 is a schematic view illustrating the distribution of magnetic field of a magnet and the directions of the magnet.

FIG. 14 shows a magnetic field distribution and an orientation of the magnet 11, in which a simulated distribution is represented as shown on a plane of x and z-axes under a condition that a central point of the magnet 11 is located at an intersection of the x and z-axes. In this case, the magnet 11 made of samarium cobalt has Br: 7000 gauss and Hc: 7000 oerstead, as mentioned above. In FIG. 14, each arrow represents the orientation and strength of the magnetic field.

After confirming the magnetic field distribution of the magnet 11, the positions of the elements 12-1 and 12-2 with respect to the magnet 11 are determined, and thus, using this magnet 11 itself, a predetermined initial magnetism can be automatically given to each of the elements 12-1 and 12-2 without any particular bias magnetic field means.

In an example shown in FIG. 14, if the magnetoresistive sensing element 12-1 (or 12-2) having a thin film magnetic pattern 34 parallel to the x-axis is located at a point indicated by o, an initial magnetism of 150 oerstead can be given to the thin film magnetic pattern 34.

Figure 16:
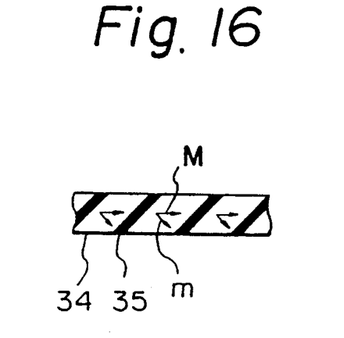
FIG. 16 is a partial plan view for explaining the initial magnetism in the magnetoresistive sensing elements of FIG. 10.

The initial magnetism is given in the longitudinal direction (x-axis) of the thin film magnetic pattern 34 as shown by arrows M in FIG. 16 and angled by 45° to the direction of current shown by arrows m between the conductive patterns 35.

Figure 15:
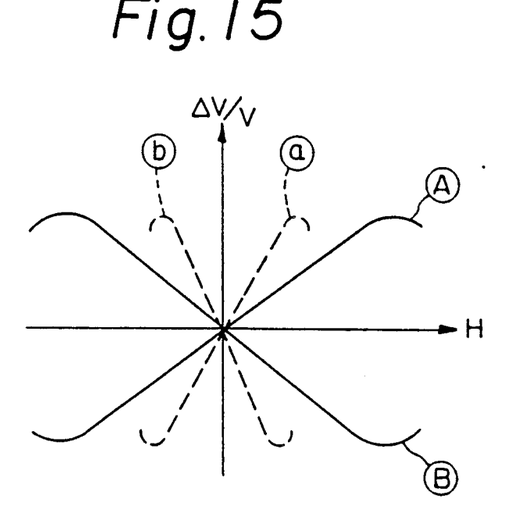
FIG. 15 is a diagram showing the output characteristics of the sensor shown in FIG. 10.

In a sensor shown in FIG. 10 having the thin film magnetic patterns 34 to which the above-mentioned initial magnetism is given, the output characteristics (i.e., changes of voltage $\Delta V/V$ with respect to the external magnetic field H by the magnet 11) of the magnetoresistive sensing elements 12-1 and 12-2 are represented as solid lines (A) and (B) in FIG. 15, from which it is clearly understood that the range of measurement can be significantly increased when compared with the output characteristics represented by dotted lines (a) and (b) when such an initial magnetism is not given.

FIG. 17 shows a process for making a sensor. A silicon wafer 37 having a face orientation of 100, as illustrated in (A), is formed with a plurality of holes 31, cut into a corresponding plurality of rectangular shaped silicon substrates 30.

In more detail, the surface of the silicon wafer 37 is coated with an oxide film 38 by heat oxidation as shown in (B) and then coated with a resist, which is then exposed with a light beam and developed to form a resist film 40 having a substantially rectangular opening 39 as shown in (C) and (C'). The oxide film 38 on the exposed opening 39 is then removed and the resist film 40 is also removed, to obtain a masking pattern 38a of the oxide film 38 having an opening 38b as shown in (D) and (D'). Then, a through opening 31 having a recess 33 is formed by anisotropically etching the portion of opening 38b as shown in (E) and (E'). In this case, if a mixed liquid of 255 cc of ethylenediamine, 120 cc of H₂O, and 45 g of cathecol is used at 100° to 110° C as an etching liquid, the etching depth is 60 to 80 μm/hour and, therefore, such an opening 31 can be formed in about four hours, assuming that the thickness of the silicon wafer 37 is 280 μm.

Figures 17A, 17B:
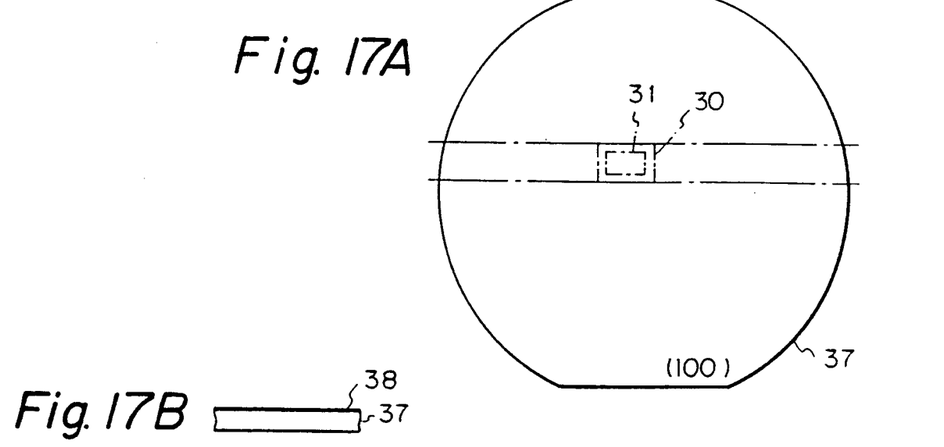
FIG. 17 is a schematic view for explaining, in series, a process for making an acceleration sensor using a magnetic field sensor according to the present invention.
Figure 17C:
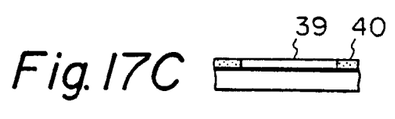
Figure 17D:
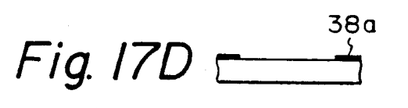
Figure 17E:
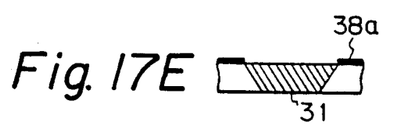
Figure 17F:
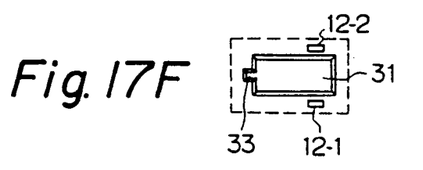
Figure 17G:
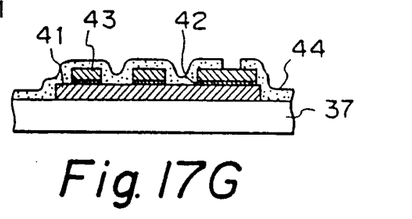

Then, an oxide film is formed again over all of the front and rear surfaces of the silicon wafer 37 including the inner wall of the hole 31 and, subsequently, magnetoresistive sensing elements 12-1 and 12-2 are formed on the frame portions thereof as shown in (F). These elements 12-1 and 12-2 are formed as follows. As shown in (F), magnetic layers 41, film layers 42 consisting of Ja, Mo or the like and conductive layers 43 are formed by evaporation on the oxide film of the silicon wafer 37. Then, thin film magnetic patterns 34 of the magnetic layers 41 and conductive patterns 35 of the conductive layers 43 are formed, respectively, by a process, such as etching. Then, the surface of the wafer 37 is coated with a protective layer 44 consisting of Si₃N₄ or the like. Finally, the silicon wafer 37 is cut along a dotted line shown in (F) to obtain a plurality of individual rectangular shaped silicon substrates 30.

Magnetoresistive sensing elements 12-1 and 12-2 may be made by another method separately from such a silicon wafer 37 and then rigidly adhered to the frame surfaces of the silicon wafer 37.

Figure 18:
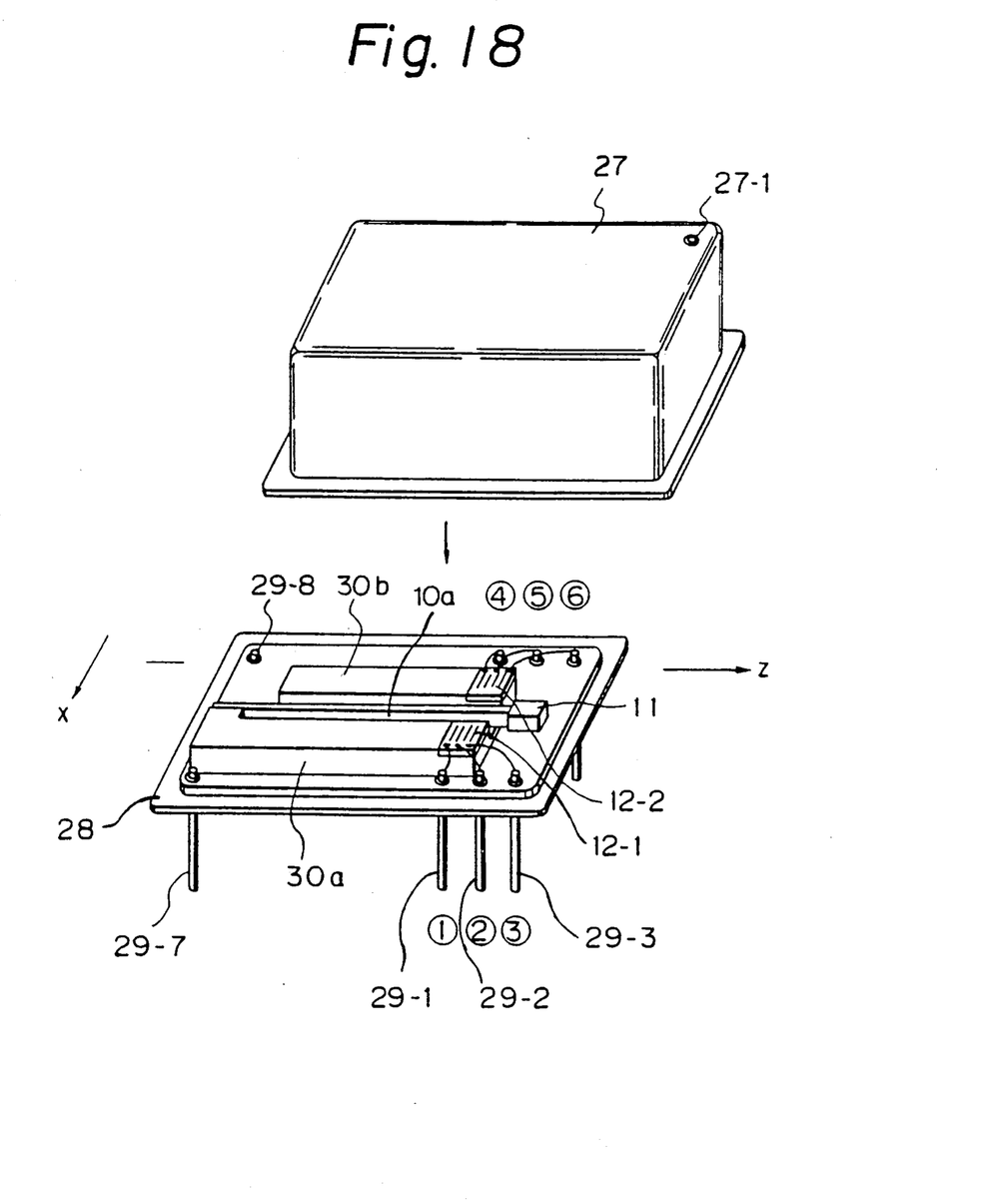
FIG. 18 is an exploded perspective view similar to FIG. 10, but illustrating another embodiment of this invention; and, FIG. 19 is a plan view, similar to FIG. 11, but illustrating another embodiment of the magnetoresistive sensing elements.

FIG. 18 is an exploded perspective view, similar to FIG. 10, but illustrating another embodiment of acceleration sensor utilize a magnetic field sensor according to the present invention. In this embodiment, the cap 27 having a sealing inlet 27-1 and the base 28 having terminals 29-1 to 29-8 are the same as those of the embodiment shown in FIG. 10.

In this embodiment, however, two support members 30a and 30b made of, for example, brass, are used instead of the silicon substrate 30. A cantilever beam 10 made of, for example, phosphoric bronze, has one end to which a permanent magnet 11 is attached and the other end which is fixedly supported on one end of the support member 30a. A pair of barber-pole type magnetoresistive sensing elements 12-1 and 12-2 are arranged on the support members 30a and 30b, respectively, which are fixed on the base 28 by an appropriate adhesive and serve as stoppers when the beam 10 is bent by abrupt shocks. These elements 12-1 and 12-2 have plural connecting pads 32, separately, numbered ① to ⑥, which are connected to the external terminals 29-1 to 29-6, respectively, via aluminum bonding wires.

Figure 19:
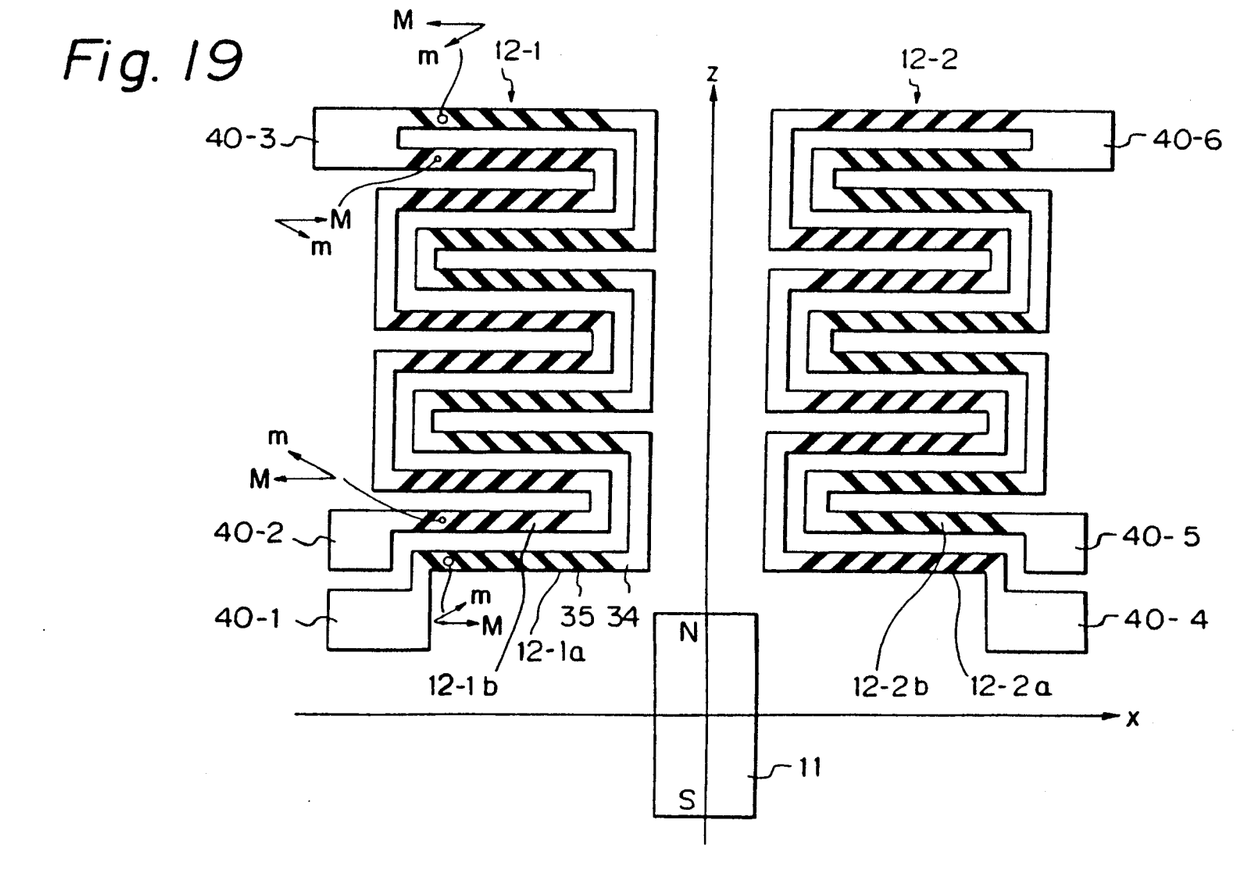

FIG. 19 is a view similar to FIG. 11, but illustrating another pattern of the barber-pole type magnetoresistive sensing elements 12-1 and 12-2, each of which consists of two winding or zig-zag patterns 12-1a and 12-1b (and 12-2a and 12-2b) made of magnetic thin films 34 of permalloy (Ni—Fe alloy) and extending substantially in parallel to each other. These patterns 12-1a and 12-1b have respective first ends defining input terminal pads 40-1 and 40-2 and second ends connected to each other to form a common output terminal pad 40-3. Similarly, the patterns 12-2a and 12-2b have respective input terminal pads 40-4 and 40-5 and a common output terminal pad 40-6.

A plurality of conductive stripe patterns 35, made of gold or the like, are formed on each of the magnetic thin films 34 so as to incline thereto by, for example, 45°. The respective conductive patterns 35 on the films 12-1a and 12-1b are, however, inclined in the opposite directions to each other, so that a bias current i₁ flowing through the conductive pattern 35 on the film 12-1a and a bias current i₂ flowing through the conductive pattern 35 on the film 12-1b are angled by, for example, 90°, as shown.

When predetermined bias currents i₁ and i₂ are flowed to these patterns 12-1a and 12-1b (12-2a and 12-2b) from the input terminals 40-1 and 40-2 (40-4 and 40-5), respectively, an external magnetic field Hex perpendicular to the longitudinal direction of these patterns 12-1a and 12-1b (12-2a and 12-2b) is amplified, so that a signal for accurately representing the external magnetic field Hex is output from the output terminal pad 40-3 (40-6). The remaining construction of this embodiment is the same or similar to that of the embodiment shown in FIG. 11.

We claim:

1. A barber-pole type magnetoresistive sensing element, comprising:

first and second zig-zag patterns of magnetic thin film lying substantially in a common plane, each film pattern comprising a first plurality of spaced, parallel segments extending in a first direction and a second plurality of spaced, parallel segments extending in a second direction transverse to the first direction and respectively, integrally interconnecting the adjacent first segments at the opposite ends thereof in an alternating sequence in accordance with the zig-zag pattern;

the respective first segments of the first and second zig-zag patterns being interdigitized and parallel, spaced relationship and with the respective, second segments thereof being in spaced and parallel, aligned relationship;

the first and second zig-zag patterns of magnetic thin films having respective, first ends defined corresponding input terminal pads and respective, second ends connected together to form a common output terminal pad; and first and second patterns parallel, spaced line segments conductive material having a higher conductivity than that of the magnetic thin film, formed on the respective first and second zig-zag patterns of magnetic thin film, the first conductive pattern line segments being angularly inclined, relatively to the first plurality of parallel segments of the first zig-zag pattern, in a first sense, and the second conductive line segments being angularly inclined, relatively to the first plurality of parallel segments of the second, zig-zag pattern in a second, opposite sense, the first and second conductive material line segment patterns producing respective, first and second net bias current flow paths in the corresponding first and second magnetic thin film patterns which are angularly inclined with respect to each other.

2. A barber-pole type magnetoresistive sensing element, as recited in claim 1, wherein:

the first and second conductive segments are angularly inclined at approximately 45° and in respective, first and second opposite senses relatively to the respective first pluralities or parallel segments of the first and second zig-zag patterns of magnetic thin film and correspondingly at approximately 90° relatively to each other; and the respective, net bias current flow paths in the first and second magnetic thin film zig-zag pattern are angularly inclined with respect to each other by approximately 90°.

3. A magnetic field sensor for sensing magnetic fields, comprising:

a base having a flat surface;

first and second magnetic sensors (12-1, 12-2) respectively comprising:

first and second zig-zag patterns (12-1a), 12-1b; 12-2a, 12-2b) of magnetic thin film lying substantially in a common plane on said flat surface, each film pattern comprising a first plurality of spaced, parallel segments extending in a first direction and a second plurality of spaced, parallel segments extending in a second direction transverse to the first direction and respectively, integrally interconnecting the adjacent first segments at the opposite end thereof in an alternating sequence in accordance with the zig-zag pattern;

the respective first segments of the first and second zig-zag patterns being in interdigitized and parallel, spaced relationship and with the respective, second segments thereof being in spaced and parallel, aligned relationship;

the first and second zig-zag patterns of magnetic thin films having respective, first ends defining corresponding input terminal pads (40-1, 40-2; 40-4, 50-5) and respective, second ends connected together to form a common output terminal pad (40-3; 40-6);

first and second patterns of parallel, spaced line segments conductive material having a higher conductivity than that of the magnetic thin film, formed on the respective first and second zig-zag patterns of magnetic thin film, the first conductive pattern line segments being angularly inclined, relatively to the first plurality of parallel segments of the first zig-zag pattern, in a first sense, and the second conductive line segments being angularly inclined, relatively to the first plurality of parallel segments of the second zig-zag pattern in a second, opposite sense, the first and second conductive material line segment patterns producing respective, first and second net bias current flow paths in the corresponding first and second magnetic thin film patterns which are angularly inclined with respect to each other;

the first and second magnetic sensors being fixedly mounted on the flat surface of the base at predetermined positions substantially symmetrically spaced from each other;

one (40-1) of the input terminals of the first magnetic sensor (12-1) being electrically connected to one (40-4) of the input terminals of the second magnetic sensor (12-2);

the other (40-2) of the input terminals of the first magnetic sensor (12-1) being electrically connected to the other (40-5) of the input terminals of the second magnetic sensor (12-2);

an electric source for applying an electrical voltage between said one and the other input terminals; and a comparator for comparing outputs of said common output terminal pad of the first magnetic sensor and said common output terminal pad of the second magnetic sensor.

4. A magnetic field sensor for sensing magnetic fields, as recited in claim 3, wherein:

the first and second conductive segments are angularly inclined at approximately 45° and in respective, first and second opposite senses relatively to the respective first pluralities of parallel segments of the first and second zig-zag patterns of magnetic thin film and correspondingly at approximately 90° relatively to each other; and the respective, net bias current flow paths in the first and second magnetic thin film zig-zag pattern are angularly inclined with respect to each other by approximately 90°.

* * * * *